Jan. 24, 1961

G. SIM 2,969,432

NON-INTERFERING TAPE FEED-OUT MECHANISM

Filed May 20, 1959

6 Sheets-Sheet 1

INVENTOR
GORDON SIM

BY R. C. Terry
ATTORNEY

Jan. 24, 1961 G. SIM 2,969,432

NON-INTERFERING TAPE FEED-OUT MECHANISM

Filed May 20, 1959

6 Sheets-Sheet 2

INVENTOR
GORDON SIM

BY R.C. Terry

ATTORNEY

Jan. 24, 1961

G. SIM 2,969,432

NON-INTERFERING TAPE FEED-OUT MECHANISM

Filed May 20, 1959

6 Sheets-Sheet 3

INVENTOR
GORDON SIM

BY R.C. Perry

ATTORNEY

INVENTOR
GORDON SIM
BY R. C. Perry
ATTORNEY

Jan. 24, 1961 G. SIM 2,969,432

NON-INTERFERING TAPE FEED-OUT MECHANISM

Filed May 20, 1959 6 Sheets-Sheet 5

INVENTOR
GORDON SIM

BY R. C. Lerry

ATTORNEY

Jan. 24, 1961

G. SIM 2,969,432

NON-INTERFERING TAPE FEED-OUT MECHANISM

Filed May 20, 1959

6 Sheets-Sheet 6

INVENTOR
GORDON SIM

BY R. C. Lerry

ATTORNEY

United States Patent Office 2,969,432

Patented Jan. 24, 1961

2,969,432

NON-INTERFERING TAPE FEED-OUT MECHANISM

Gordon Sim, Northbrook, Ill., assignor to Teletype Corporation, Chicago, Ill., a corporation of Delaware Filed May 20, 1959, Ser. No. 814,557

16 Claims. (Cl. 178—92)

This invention relates to printing telegraph apparatus and more particularly to a printing telegraph tape perforator having an automatic tape feed out mechanism.

In the printing telegraph art, tape perforators are utilized for perforating permutation codes in a tape in response to incoming line signals. In these perforators, the punches which effect the perforating are usually selectively actuated under control of a selector mechanism which in turn responds to the incoming line signals. In such perforators, it is frequently desirable to provide mechanism for feeding out a predetermined length of tape at the end of each message so that a complete message may be torn off and the tape with the message on it used for re-transmitting the message which has been received by the perforator. In the past, there have been numerous devices for effecting such operations but they have usually been so designed that an incoming signal which arrives at the perforator, at certain portions of the cycle of feed out of tape from the perforator, will be multilated due to the fact that the perforator is not capable of accepting the incoming signals representing the first character of a new message if it is in the process of feeding out tape. In some of the devices provided heretofore, several characters have been mutilated before the perforator feed out cycle and the incoming signal cycle were synchronized.

It is an object of the present invention to provide a printing telegraph tape perforator having a tape feed out mechanism which will not interfere with the perforation of even a single character of an incoming message which is received by the perforator during any portion of the tape feed out cycle.

Another object of the invention is to provide a printing telegraph tape perforator wtih a tape feed out mechanism that automatically initiates a tape feeding operation upon the cessation of incoming signals.

A still further object of the invention is to provide a printing telegraph tape perforator which will automatically feed out a predetermined length of tape beginning a predetermined time after the cessation of signals incoming to the perforator.

In accordance with one embodiment of the invention, a novel tape feed out mechanism is incorporated in a tape perforator of the type disclosed in the copending application of R. E. Arko and C. W. Swan, Serial No. 725,935, filed April 2, 1958. In the apparatus disclosed in said copending application, a selector mechanism initiates a cycle of rotation of a selector cam sleeve upon a change in the line condition of a telegraph system from "marking" (current) to "spacing" (no current) and thereupon selectively actuates punch interposers for selecting punches for operation in accordance with a permutation code of signals as received in the selector mechanism. In the present invention, such a perforator mechanism is equipped with a metering device including a pawl mechanism that is driven continuously by the same shaft that drives the selector cam sleeve through one cycle of rotation each time a code combination of signals is received in the apparatus. In the normal condition of the apparatus, when no line signals are being received, the pawl mechanism is latched out of operative relation with its associated ratchet. The pawl mechanism is conditioned for operation at the end of each code combination of signals received in the apparatus and will move to operative association with its associated ratchet unless a succeeding code combination of signals immediately follows the first received code combination. The metering mechanism is driven one step for each cycle of rotation of the driving shaft and after a predetermined number of steps, the metering mechanism will initiate a tape feeding cycle. In the tape feeding cycle the tape will be advanced one step for each cycle of the driving mechanism and the metering mechanism will count the number of steps of tape feeding operations and after a predetermined number of said tape feeding steps have taken place, will restore the tape feeding mechanism to an inactive condition preparatory to receiving further messages in the perforator mechanism whereby a slight pause in the receipt of line signals will not initiate a tape feeding operation, but a tape feeding operation will only be initiated after a predetermined time interval.

A more complete understanding of the invention may be had by reference to the following detailed description when considered in conjunction with the accompanying drawings wherein:

Fig. 1 is a plan view of a tape perforator of the type disclosed in the copending application of R. E. Arko and C. W. Swan identified hereinbefore, but equipped with the novel tape feed out mechanism of the present invention;

Figure 1:
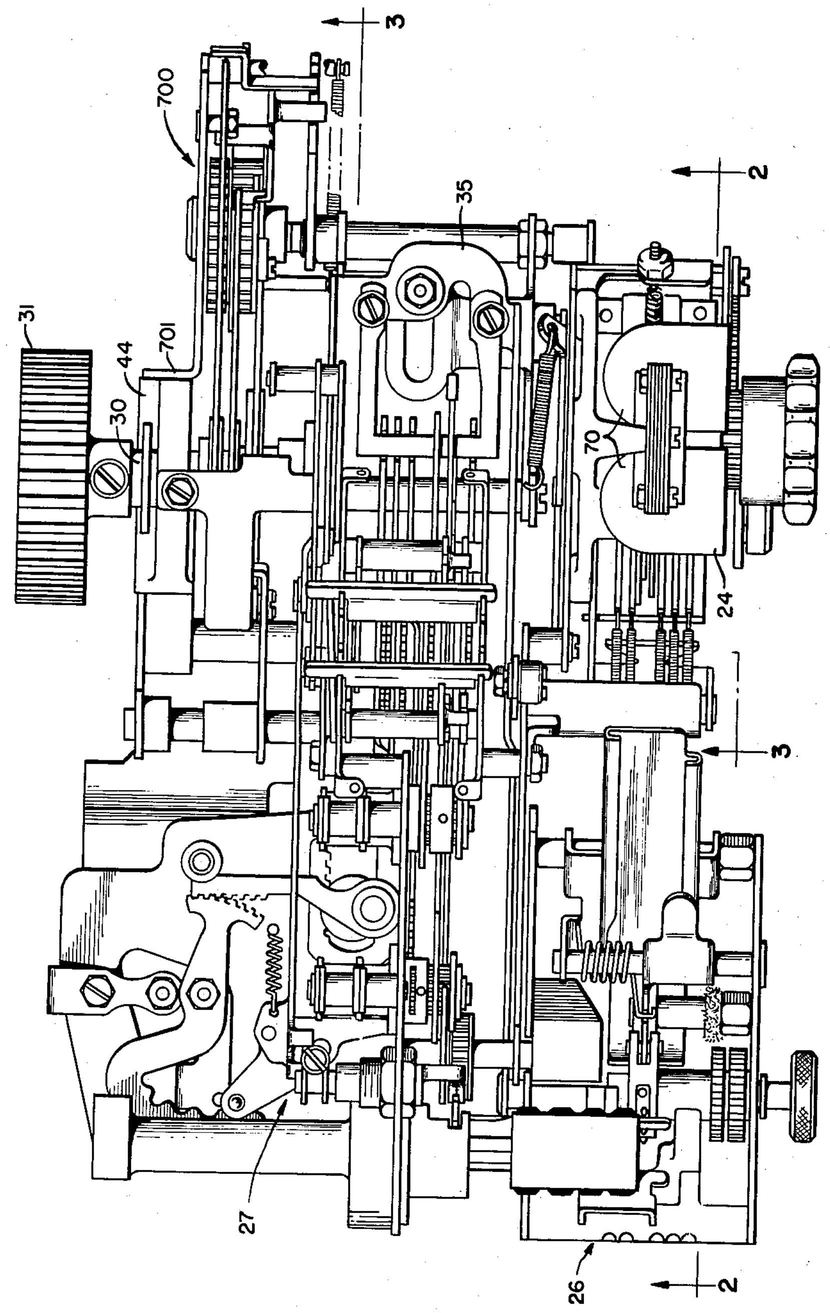

In order to facilitate an understanding of the present invention, the parts of the apparatus which correspond to those disclosed in detail in the above-identified application of R. E. Arko et al., the disclosure of which is incorporated herein by reference, are designated by the same reference characters used in said copending application and those parts which have been added or modified are designated by reference numerals beginning with the reference numeral 700. Only so much of the disclosure of said copending application of R. E. Arko et al. is repeated herein as is necessary to a complete understanding of the present invention.

Power for driving the apparatus is supplied by a motor (not shown) which drives a sprocket wheel 31, continuously as long as the apparatus is in use, to drive a main power shaft 30. The shaft 30 has mounted on it a selector clutch 32 which may be tripped to impart one cycle of rotation to a selector cam sleeve 46 in a selector mechanism 24. The selector mechanism 24, through various instrumentalities, controls a punch mechanism 26 and a type wheel positioning mechanism 27.

The selector mechanism 24 translates signalling code into mechanical movements which effect the punching of tape fed into the apparatus and the printing of messages. Electrical pulses comprising permutation code combinations are applied to the coils of a selector magnet 70 having an armature 71 which controls the selective operation of the selector mechanism 24.

As is usual in printing telegraph systems, the normal condition of the telegraph line is a "marking" or current condition and initiation of a transmission cycle starts with a "spacing" or no current condition on the line. Thus, in the normal operation of such systems, the apparatus at the receiving terminal, such as a perforator of the type disclosed herein, has its selector magnet 70 energized and consequently, the armature 71 of the magnet is attracted to the magnet. When the selector magnet 70 is energized, the armature 71 will be in blocking condition with respect to a start lever 72 but immediately upon the initiation of a transmission cycle, the armature 71 will drop from the position shown in Fig. 2, thus permitting the start lever 72 to rock in a clockwise direction from the position shown in said figure to initiate a selecting cycle. When the start lever 72 falls from the position shown in Fig. 2 under the influence of its actuating spring (not shown), it will rock the end portion 48 of a stop arm bail 49 out of blocking engagement with a stop projection or clutch shoe lever 47 thus to trip the selector clutch 32 and connect the selector cam sleeve 46 to the main power shaft 30. After one rotation of the cam sleeve 36, the clutch shoe lever 47 will engage with the end portion 48 of the stop arm bail 49 to disengage the clutch.

Figures 2, 5, 6:
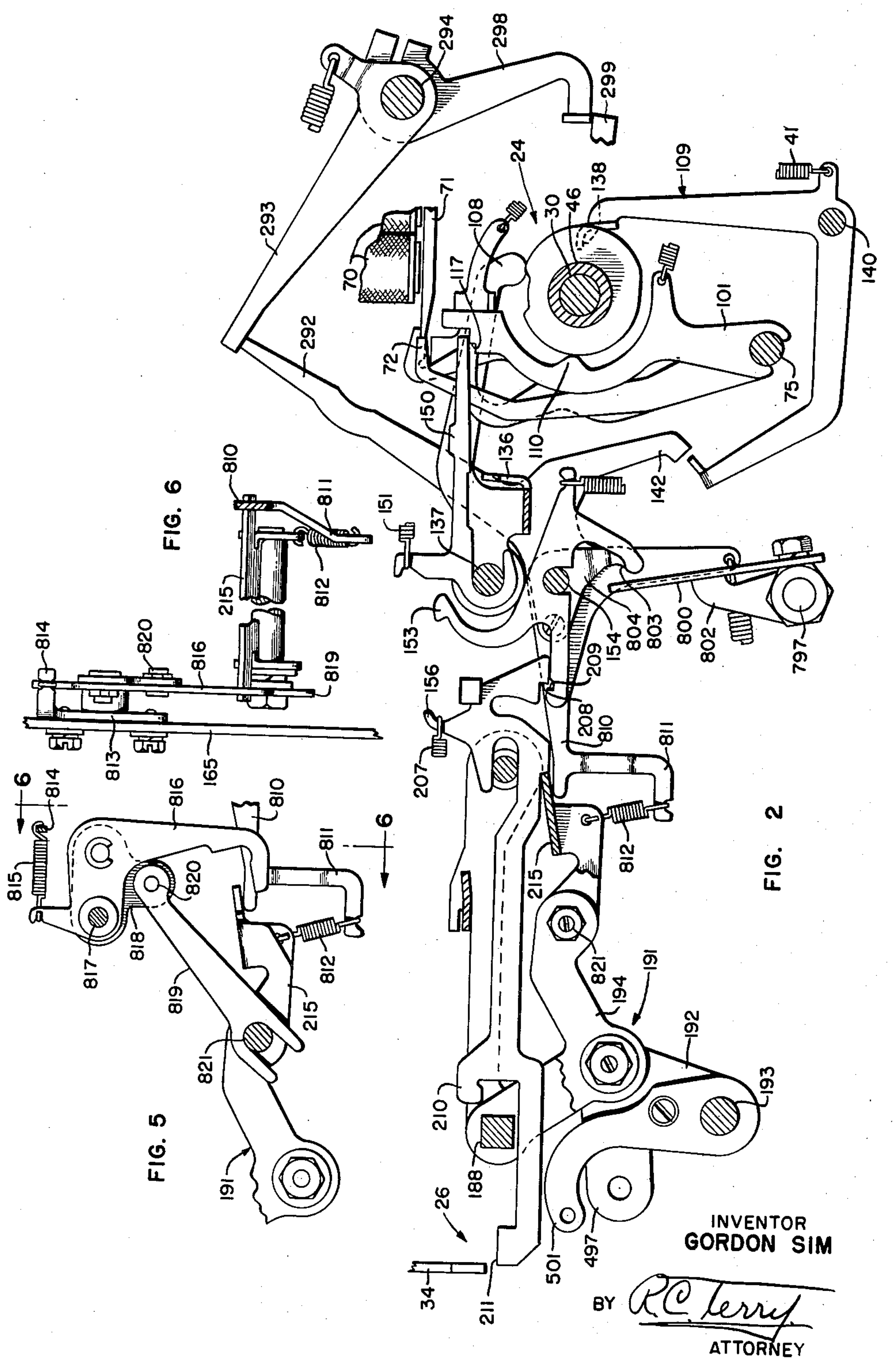
Fig. 2 is a longitudinal, vertical, sectional view taken substantially along the line 2—2 of Fig. 1 in the direction of the arrows showing the mechanism for selecting punches for actuation, the supporting structure being eliminated for the sake of clarity.
Fig. 5 is a fragmentary view of some of the apparatus shown in Fig. 2 and also showing some of the details of the mechanism which controls the metering apparatus.
Fig. 6 is an end view looking at the right end of the mechanism shown in Fig. 5.

As the selector cam sleeve 46 rotates, the permutation code of signals being received in the apparatus will either energize or de-energize the selector magnet 70 and thus, as the cam sleeve 46 rotates, the position of the armature 71 will determine the selective operation of various instrumentalities for effecting perforating and printing on the tape. Upon the receipt in the selector magnet 70 of a marking pulse, a selector cam lever such as the selector cam lever 101 will be permitted to rock, in a clockwise direction about its pivot shaft 75 due to the release of the selector cam lever 101 by the armature 71 at a time in the cycle when an indentation in the cam, associated with the selector lever 101, is aligned with the camming projection 110 on the selector cam lever 101. This will permit a push lever 150 associated with that selector cam lever 101 to drop down and engage a shoulder 117 on the selector cam lever 101 whereby, as the selector cam sleeve 46 continues to rotate and the selector cam lever 101 is rocked counterclockwise, due to the camming projection 110 thereon engaging a high portion of the cam on the selector cam sleeve 46, the push lever 150 will be moved to the left (Fig. 2). The push levers 150 are oscillatable about and slidable on a stationary shaft 137 and are normally urged to rock clockwise and to move to the right by actuator springs 151 individual thereto.

When permutatively selected ones of the push levers 150 are permitted to rock clockwise about the shaft 137 due to their selection for operation by their respective selector cam levers, such as lever 101, and the push levers 150 are subsequently pushed to the left (Fig. 2), they will trip selector slide latches 153 individual to them to rock the selector slide latches 153 counterclockwise about a shaft 154. Any of the selector slide latches 153 that are thus tripped will release their associated punch selector slides 156 due to the disengagement of a latching shoulder 209 on the selector slide latch 153 from a latching portion 208 formed on the punch selector slide 156. The punch selector slides 156 are normally urged to move to the left (Fig. 2) by contractile springs 207 individual to them. Any of the punch selector slides 156 that are released by their associated slide latches 153 will move to the left (Fig. 2) to carry a shoulder 210 thereon into operative relationship with a cross bar 188 forming a part of the perforator-actuating mechanism. This leftward movement of the punch selector slides 156 will also move them into operative association with their associated punches 34 in the punch mechanism 26 whereby, when at a later time in the cycle of operation of the apparatus, the cross bar 188 is moved upwardly, the selected punch selector slides 156 will actuate their associated punches 34 to perforate the tape with a permutation code of holes as controlled by the signals received by the selector magnet 70.

Figure 7:
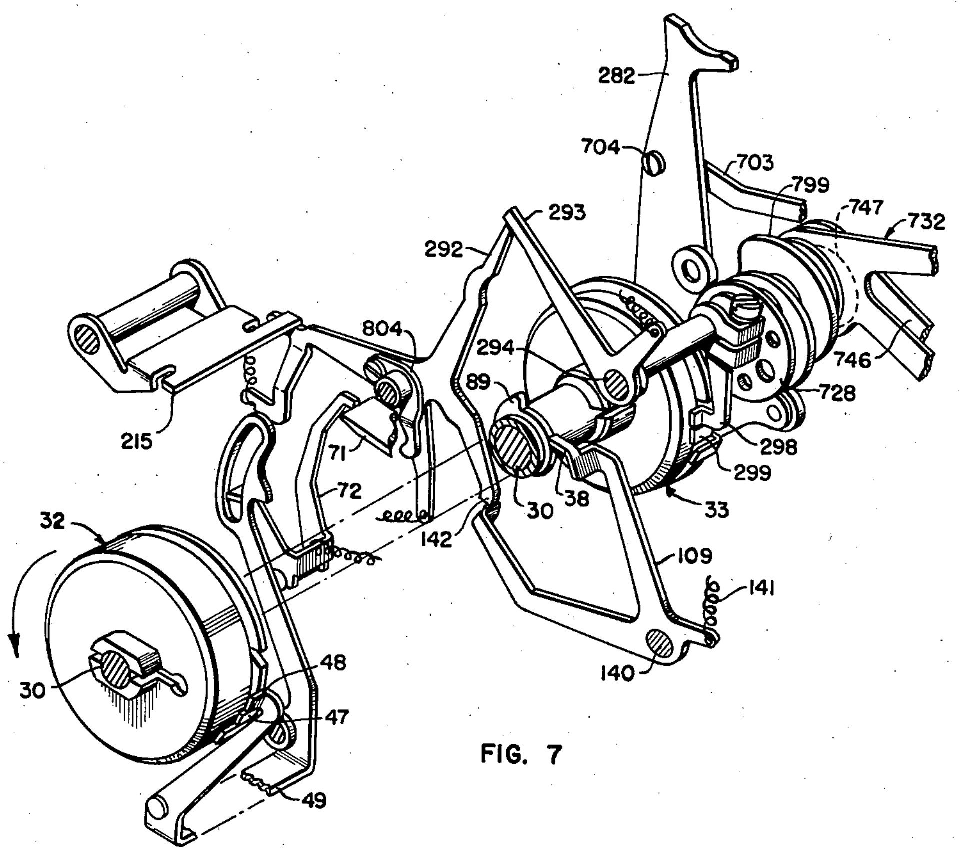
Fig. 7 is a partially exploded view in perspective of the apparatus which initiates a cycle of operation of the various mechanisms in the perforator.

After punches 34 have been selected for actuation and very near to the end of the cycle of rotation of the selector cam sleeve 46, a function clutch 33 is tripped to actuate the punch mechanism 26 and the type wheel positioning mechanism 27. Tripping of the function clutch 33 is effected when a four-armed lever 142 (Fig. 7) is rocked counterclockwise about the stationary shaft 137 and the rocking of the four-armed trip lever 142 is caused by a function clutch cam lever 109 riding off of the high portion of a function clutch cam 89 on the selector cam sleeve 46. The function clutch cam lever 109 is urged to rock in a counterclockwise direction about a stud shaft 140 by a contractile spring 141 and carries a cam follower 138 formed on it against the camming surface of the function clutch cam 89. Thus, very near to the end cycle of rotation of the selector cam sleeve 46, the lever 109 will be rocked in a clockwise direction (Figs. 2 and 7) by its associated cam 89 to bring its left-hand end into engagement with the four-armed trip lever 142, thereby to rock the trip lever 142 counterclockwise (Figs. 2 and 7). The lever 142 has an arm 292 normally in blocking engagement with a lever 293 which is fixed to a shaft 294 that is urged to rock counterclockwise as viewed in Figs. 2 and 7, by a spring 295. A clutch trip lever 298 is also fixed to the shaft 294 and is normally in blocking relation to a clutch shoe lever 299. When the clutch trip lever 298 is rocked counterclockwise, as viewed in Figs. 2 and 7, it will release the clutch shoe lever 299 and permit the clutch 33 to engage and drive a function cam 288 through a complete cycle of rotation. The function cam 288 is mounted upon the power shaft 30 and will be clutched to the shaft 30 for rotation with it when the clutch 33 is tripped. Oscillatable about a rock shaft 285 (Fig. 3) is a rocker bail 282 which actuates the punch mechanism 26 and type wheel positioning mechanism 27 selectively under control of the selector mechanism 24. Thus, all of the functions of the apparatus are set up under control of the selector mechanism and then are effected by the oscillation of the rocker bail 282.

The mechanism for effecting a tape feed out operation, designated generally by the reference numeral 700, includes a mounting plate 701 that is suitably fixed to a rear bearing plate 44 (Fig. 1). The plate 701 has a pin 702 fixed to it for supporting and guiding the right end (Fig. 3) of a restoring slide bar 703 which is pivotally attached to the rocker bail 282 by means of a pivot pin 704. The pin 702 extends into a slot 705 in the restoring slide bar 703 and has a nut 706 threaded on its free end for holding the slide bar 703 against the mounting plate 701. The restoring slide bar 703 is guided in a path such that its right end (Fig. 3) will engage a bent over portion 707 of a latch lever 708 as the restoring bar nears the end of its travel to the right.

Figure 3:
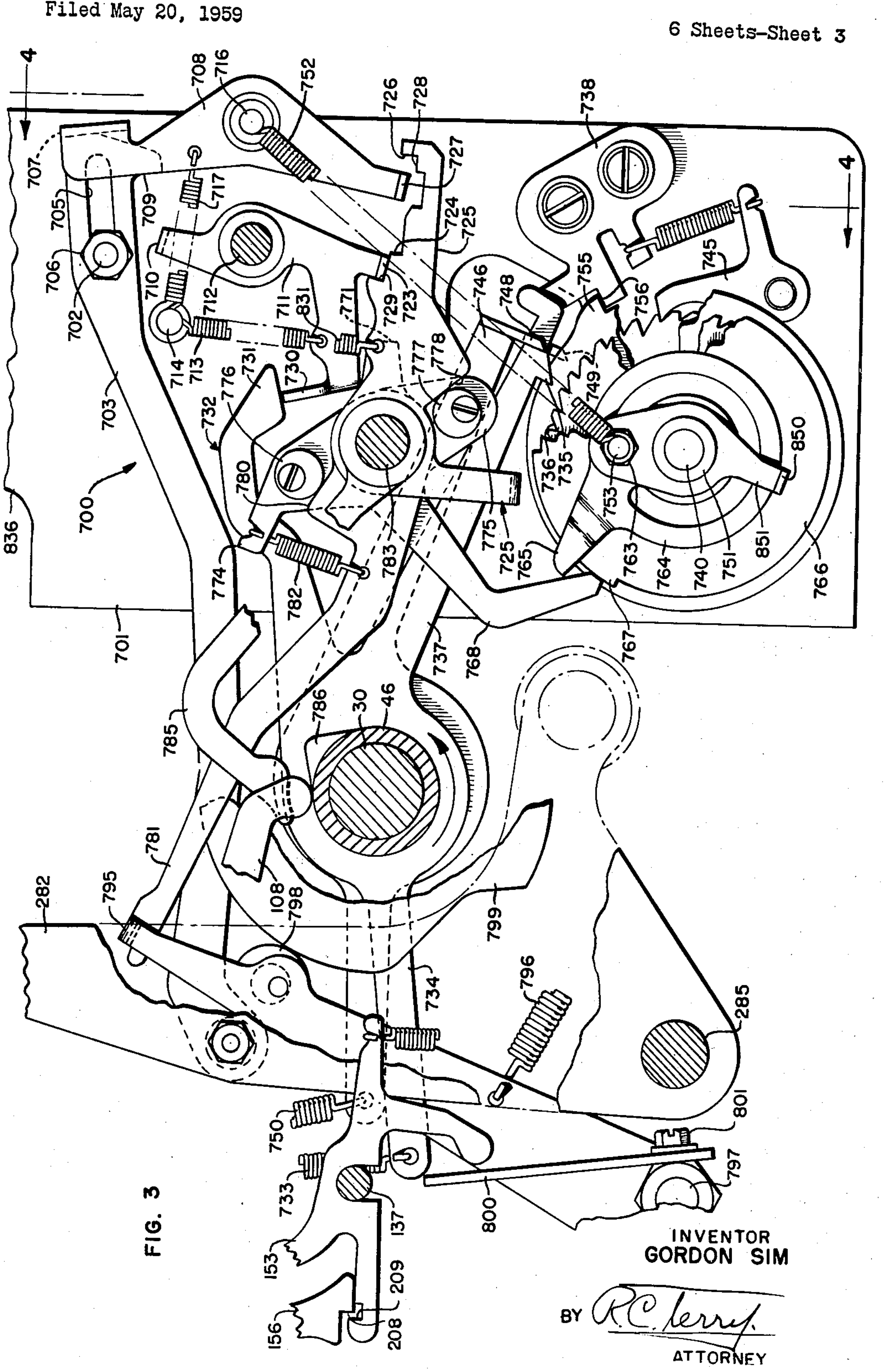
Fig. 3 is an enlarged vertical, sectional view taken substantially along the line 3—3 of Fig. 1 in the direction of the arrows showing details of the metering mechanism.

Formed on the lower edge of the restoring slide bar 703 is a shoulder 709 for engaging a laterally extending portion 710 of a trip lever 711 and actuating said trip lever as the slide bar 703 nears the end of its travel to the left (Fig. 3). The trip lever 711 is pivotally mounted on a pivot stud 712 fixed to the plate 701 and is urged to rock in a clockwise direction (Fig. 3) by a contractile spring 713 which is attached to the trip lever 711 and to a pin 714 fixed to the plate 701.

The latch lever 708 has a hub portion 715 fixed to it (Fig. 4) for holding the body of the lever in spaced relation to the plate 701. A pivot pin 716 fixed in the plate 701 supports the latch lever 708 for oscillatory movement and a spring 717 having one end attached to the pin 714 is also attached to the latch lever 708 to urge it to rock in a counterclockwise direction (Fig. 3) about the pin 716.

The trip lever 711 has a latching projection 723 on it for engagement with a latching shoulder 724 or a latching shoulder 729 on a bell crank lever 725. When the projection 723 engages the shoulder 724 on the lever 725 the trip lever 711 is blocked from movement by its spring 713. The bell crank lever 725 also has a shoulder 726 formed on it which limits the counterclockwise movement (Fig. 3) of latch lever 708 by engaging the edge of a transversely disposed portion 727 of the lever 708. When the transversely disposed portion 727 is in engagement with the shoulder 726 it will be positioned over a vertically disposed surface 728 of the bell crank lever 725 and will prevent the lever 725 from rocking counterclockwise (Fig. 3). However, when the portion 727 is above the surface 728 and consequently is in blocking position with respect to the bell crank lever 725, trip lever 711 may be moved clockwise (Fig. 3) by its spring 713 until the projection 723 on its engages the shoulder 729 on the bell crank lever 725 where it will hold the bell crank lever 725 in its extreme clockwise position as shown in Fig. 3.

In moving to the position shown in Fig. 3 where its projection 723 engages the shoulder 729, the trip lever 711 will carry a laterally extending arm 730 formed on it into actuating association with an arm 731 of a three-armed detent pawl 732. The detent pawl 732 is freely oscillatable on the shaft 30 and is normally urged to rock clockwise (Fig. 3), by a contractile spring 733 which is connected to an arm 734 of the detent pawl 732 and urges a ratchet engaging portion 735, formed on an arm 737 of the detent pawl 732, into engagement with the teeth of a ratchet 736. The lower right end of the arm 737 is guided by a combined guide and stop block 738 fixed to the plate 701. When the trip lever 711 is rocked clockwise (Fig. 3), by its spring 713, it will rock the three-armed detent pawl 732 counterclockwise about the shaft 30 and disengage the portion 735 from the ratchet 736.

Figure 4:
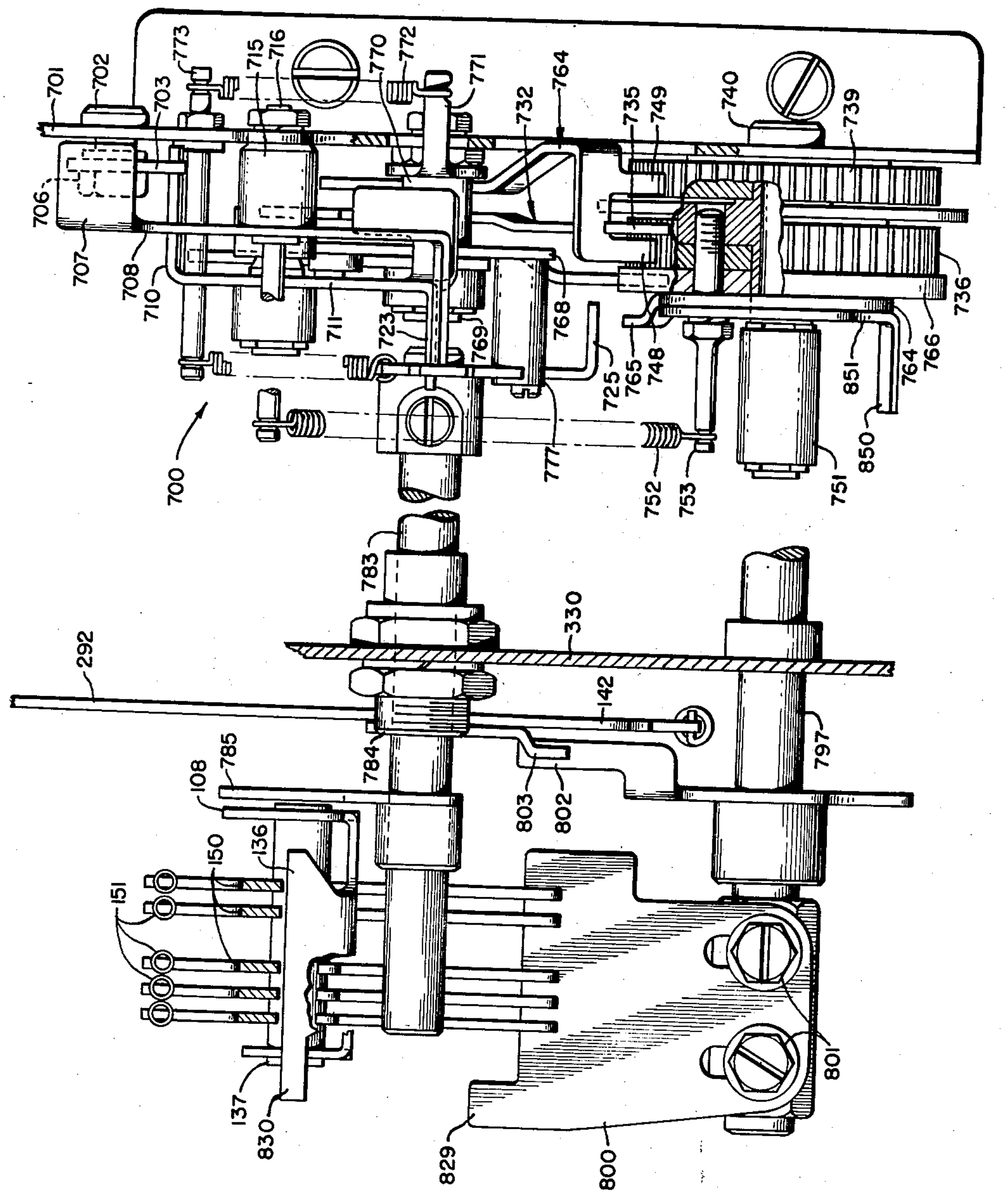
Fig. 4 is a transverse view taken substantially along the line 4—4 of Fig. 3 in the direction of the arrows and showing parts of the metering mechanism in end elevation.

As will be seen most clearly by reference to Fig. 4 the ratchet 736 and a second ratchet 739 are mounted on a stub shaft 740, for free rotation with respect thereto. A spring actuated retaining pawl 745 (Fig. 3) engages the teeth of ratchet 739 and prevents any clockwise rotation of ratchet 739 as viewed in Fig. 3. The ratchet 739 and the ratchet 736 are arranged to be driven by a continuously oscillated driving pawl 746 which is mounted on an eccentric 747 (Fig. 7) fixed to the shaft 30. The driving pawl 746 has two pawl teeth 748 and 749 formed at its free end for engagement with the ratchets 736 and 739, respectively. The pawl tooth 749 is longer than the pawl tooth 748 and will engage the teeth of its associated ratchet 739 each time the driving pawl 746 is oscillated provided the driving pawl is not held out of engagement with the ratchets by the arm 737 of the detent pawl 732.

Every sixth tooth on the ratchet 739 is cut deeper than the other teeth whereby whenever the pawl tooth 749 is dropped into a deep tooth, the pawl tooth 748 will be permitted to engage a tooth on its associated ratchet 736 and move the ratchet 736 one step in a counterclockwise direction (Fig. 3). Thus, the driving pawl 746, when it is in driving relation to the ratchets, will operate the ratchet 736 once for each six operations of the ratchet 739 and the detent pawl 732 will prevent the ratchet 736 from being rotated in a clockwise direction (Fig. 3) as long as the detent pawl is maintained in engagement with the teeth of the ratchet 736. The driving pawl 746 is urged into engagement with the ratchets 736 and 739 by a contractile spring 750 attached to its left end (Fig. 3).

The stub shaft 740, on which the ratchets 736 and 739 are rotatable, has a tubular member 751 freely rotatable on it for engagement by a return spring 752 which is attached to the pivot pin 716 and to a pin 753 that is fixed to the ratchet 736. When the ratchet 736 is rotated in a counterclockwise direction (Fig. 3) by its associated pawl tooth 748, the return spring 752 will be stretched and will wrap around the tubular member 751 as long as the detent pawl 732 is in its operative position. If the detent pawl 732 is raised to disengage its ratchet engaging portion 735 from the teeth of the ratchet 736 the spring 752 will rotate the ratchet 736 clockwise (Fig. 3) until a stop projection 755 on the ratchet engages a stop shoulder 756 on the block 738.

The shank of the pin 753 is threaded into the body of the ratchet 736 and has a hexagonal shoulder 763 formed on it whereby it may be attached to the ratchet 736 and may serve as a clamp for adjustably holding a trip plate 764 in adjusted position on the ratchet 736. The trip plate 764 has a trip arm 765 on it which may be adjusted to measure the amount of tape fed out of the apparatus at each tape feeding operation. The pin 753 also serves to clamp a camming disc 766 to the ratchet 736. A raised portion 767 of the camming disc 766 cooperates with a lever 768 to hold the lever 768 in a predetermined position during the early portion of the metering operation of the apparatus to prevent tape being fed out for a predetermined length of time after the metering operation starts. The lever 768 is pivoted on a stud shaft 769 that is fixed in the plate 701 (Fig. 4). A hub portion 770 (Fig. 4) is suitably attached to the lever 768 and to a rearwardly extending lever arm 771. The lever arm 771 has a contractile spring 772 attached to it and to a rearwardly extending portion 773 of the pin 714. This spring 772 tends to rock the lever 768 in a counterclockwise direction (Fig. 3) with respect to the stud shaft 769.

The lever 768 has oppositely extending arms 774 and 775 on which there are mounted adjustable eccentrics 776 and 777, respectively. The eccentric 777 extends forwardly to engage with a shoulder 778 on the bell crank lever 725 and the bell crank lever 725 is thus normally urged to rock in a counterclockwise direction by the eccentric 777 under the pull of the contractile spring 772 through the action of the lever 768. The upper eccentric 776 on the arm 774 engages with a shoulder 780 on a release arm 781 and the eccentric 776 and shoulder 780 on the release arm 781 are urged to stay in engagement by a contractile spring 782 connected to the arm 774 and the release arm 781.

The bell crank lever 725 is fixed to a shaft 783 that is axially aligned with stud shaft 769 and is freely rotatable in a bearing sleeve 784 which is, in turn, mounted in a bracket 330. The shaft 783 also has fixed to it a cam lever 785 the free end of which rides on a cam 786 fixed to the selector cam sleeve 46. Thus, when a signal, received in the reperforator, initiates a cycle of operation of the selector cam sleeve 46, the cam lever 785 will be rocked in a clockwise direction (Fig. 3) and since it is fixed to the shaft 783 it will rock the bell crank lever 725 in a clockwise direction and, as will be explained in the description of the apparatus, will thereby disable the metering and tape feed out mechanisms.

The release arm 781 is normally held in blocking relation to a drive arm 795 which is urged to rotate in a clockwise direction (Fig. 3), about the axis of a shaft 797, on which the drive arm is fixed, by a contractile spring 796. The drive arm 795 has a cam roller 798 on it which bears against the surface of a cam 799 fixed on the shaft 30. Thus, when the release arm 781 is not in blocking relation to the drive arm 795, the drive arm will oscillate under the action of its spring 796 as controlled by the cam 799. The shaft 797 has fixed to it a plate 800 which may be adjusted vertically with respect to the shaft 797 by means of locking nuts 801. When the plate 800 is mounted on the shaft 797 in the manner shown in Fig. 3, its upper end will be positioned to engage the downwardly extending arms of the selector slide latches 153 to trip these latches each time the drive arm 795 is oscillated. The shaft 797 also carries a trip arm 802, the upper end of which is positioned to engage a bent portion 803 (Fig. 4), of a plate 804 that is fixed to the downwardly extending arm of the four-armed lever 142 thus to trip the arm 142 and cause it to rock counterclockwise (Fig. 2), about the shaft 137 each time the cam roller 798 enters the low portion of the cam 799. As described hereinbefore, the rocking of the arm 142 from the position shown in Fig. 2 in a counter-clockwise direction will trip the function clutch 33.

During the feeding out of tape, the release arm 781 will be out of blocking relation with the drive arm 795 and consequently, the selector slide latches 153 will be tripped to release the punch selector slides each time the cam roller 798 enters the low portion of the cam 799. The oscillation of the drive arm 795 will also cause the trip arm 802 to actuate the trip lever 142 and trip the function clutch 33. Thus, each time the cam roller 798 reaches the low point of the cam 799, a function operation will be initiated and if the plate 800 is raised to the position shown in Figs. 2, 3 and 4, all of the punch selector slides 156 will be released whereby the tape will be perforated with the code combination representing "letters."

In view of the fact that an incoming signal may be received in the perforator, at any time during a feed out cycle and consequently, the selector slide latches 153 may be selectively released in accordance with that signal and the function clutch 33 also tripped through the action of the function clutch cam 89 on the selector sleeve 46, it becomes necessary to insure that the punch selector slides 156 will be completely restored to latching association with the selector slide latches 153 at the end of an operation of the function mechanism under control of the cam 799.

In the normal operation of the apparatus, as disclosed in the hereinbefore identified copending application of Arko et al., the punch selector slides 156 are restored to latching relation with the selector slide latches 153 near the end of the function cycle by a reset bail 215 that is actuated by a toggle mechanism 191 driven by an oscillatory shaft 193 which is driven by the rocker bail 282. In the present invention, the tripping of the selector slide latches 153 is effected by the plate 800, when a tape feed out cycle is taking place, and is effected by the push levers 150, when signals are being received in the apparatus. Therefore, it is possible that a signal might be received at a time such that the lever 142 would be rocked counterclockwise by the action of the cam 89, thus to release the reset bail 215 from the punch selector slides 156, before the bail 215 had completely restored the slides 156 to a position where they could be caught by selector slide latches 153. In order to obviate the possibility of this premature releasing of the punch selector slides 156 by the reset bail 215 and the consequent failure to punch the first character of a code combination received in the selector and the punching of an extra "letters" code combination in the tape, means are provided for holding the reset bail 215 in association with the punch selector slides until the possibility of such an occurrence is prevented.

This mechanism, shown most clearly in Figs. 2, 5 and 6, comprises the arm 810 on the lever 142 which positively moves the reset bail 215 into engagement with the shoulders on the punch selector slides 156 and an extension 811 on the arm 810 to which a contractile spring 812 is attached. The spring 812 is also attached to the reset bail 215 and tends to hold the reset bail 215 against the arm 810 for movement with the arm 810. However, upon the occurrence of the condition as just previously stated, the bail 215 will not be permitted to follow the arm 810 until the toggle mechanism 191 has rocked to its extreme position, thus assuring the complete return of the punch selector slides 156 and the consequent punching of the first character of a message. Mounted on the front mounting plate 165 of the apparatus is a pivot support plate 813 that has a laterally extending projection 814 to which one end of a contractile spring 815 is attached. The other end of the spring 815 is attached to a trip latch 816, which is pivotally mounted on a pivot stud 817 mounted on the plate 813 and which is urged to rock in a clockwise direction (Fig. 5) by the spring 815. The trip latch 816 has adjustably mounted on it, a plate 818 to which a push slide 819 is pivotally connected at 820. The lower left end (Fig. 5) of the push slide 819 is forked to engage, slidably, the pivot stud 821 which pivotally connects the reset bail 215 to the bell crank 194 of the toggle mechanism 191.

With the arrangement just described, the spring 812 normally tends to hold the lower surface of the reset bail 215 in engagement with the arm 810 of the lever 142 so that the reset bail 215 tends to follow the movements of the lever 142. However, in the event that an incoming signal to the perforator is out of phase with the operation of the function mechanism, operating in a tape feed out cycle, the reset bail 215 will not be permitted to follow the arm 810 of lever 142 but will be held up until the toggle mechanism has reached the end of its oscillatory movement where the punch selector slides 156 are in the position shown in Fig. 2. The reset bail 215 will be held up by the lower end of the trip latch 816 which will be held under the lower surface of the reset bail 215 by its spring 815 until the toggle mechanism 191 is fully extended and the pivot stud 821 rocks the trip latch 816 out from under the reset bail 215.

In the normal condition of the apparatus where the signal line connected to the selector magnet coils 70 is "marking" and a transmission cycle has been completed and following the transmission cycle a length of tape has been fed out of the apparatus, the mechanism will be in the condition shown in Figs. 2, 3, 4 and 7. When the apparatus is in the condition shown in Figs. 2, 3 and 7, the tape feed out mechanism 700 will be completely disabled due to the fact that the latching projection 723 of the trip lever 711 will be in the position shown in Fig. 3 where it will hold the bell crank lever 725 in its extreme clockwise position. When the bell crank lever 725 is in its extreme clockwise position and the lever 711 is consequently in its extreme clockwise position with the projection 723 engaging the shoulder 729, the laterally extending arm 730 of lever 711 will have rocked the detent pawl 732 to its extreme counterclockwise position against the action of its associated spring 733 thereby to lift the ratchet engaging portion 735 of the arm 737 out of engagement with the teeth of the ratchet 736. Since the portion of the driving pawl 746 which extends between the pawl teeth 748 and 749 lies in the path of the arm 737, the arm 737 will have lifted the pawl teeth 748 and 749 out of engagement with their respective ratchets 736 and 739. When the detent pawl 732 and the drive pawl 746 are disengaged from the teeth of the ratchet 736 and 739, the spring 752 will have rotated the disc 766 and the ratchet 736 back to the position where the stop projection 755 will be in engagement with the stop shoulder 756.

As the tape feed out cycle was completed, the trip arm 765 on the trip plate 764 engaged the downwardly extending arm of the bell crank lever 725 and rocked it to the position shown in the drawings and the bell crank lever 725, in rocking to the position shown, drove the lever 768 in a clockwise direction to move it to the position shown. Since the release arm 781 is urged to follow the lever 768 due to the interconnection thereof by the spring 782, the release arm will have moved to the position shown where it is in blocking relation to the drive arm 195. Thus, although the cam 799 continues to rotate, the drive arm 795 will be blocked from following the contour of the cam and the plate 800 will be in the position shown in Fig. 3 where it is held out of engagement with the downwardly extending arm of the selector slide latches 153. Correspondingly, the trip arm 802 (Fig. 4) will be out of contact with the bent portion 803 of the plate 804 on lever 142 and the tripping of the function clutch 33 will have been stopped.

Upon receipt in the apparatus of a character representing a code combination, which always starts with a change in the line condition from "marking" to "spacing", the armature 71 will drop from the position shown in Fig. 2 thereby to release the start lever 72 and permit it to initiate a cycle of rotation of the selector cam sleeve 46. Near the end of the cycle of rotation of the selector cam sleeve 46, the function clutch cam 89 on the selector cam sleeve 46 will trip the function clutch cam lever 109 to initiate a function cycle of the apparatus thereby to print on the tape and perforate in the tape the character represented by the code combination received in the selector mechanism. During the function cycle, the rocker bail 282 will be oscillated and will move the restoring slide bar 703 to the left (Fig. 3) to cause the shoulder 709 to engage the laterally extending portion 710 of the trip lever 711 thus to rock the trip lever 711 counter-clockwise to move the latching projection 723 from engagement with the shoulder 729 and over to a position where the spring 831 will be able to rock the bell crank lever 725 counterclockwise. As soon as the restoring slide bar 703 started to move to the left, it released the latch lever 708 and permitted its spring 717 to rock it counterclockwise to carry the transversely disposed portion 727 of the latch lever 708 above the surface 728 of the bell crank lever 725 to temporarily hold the bell crank lever 725 in its clockwise position. However, when the restoring slide bar is returned to the position shown in Fig. 3, it will rock the latch lever 708 to the position shown in Fig. 3. This action will condition the tape feed out mechanism 700 for a cycle of operation by latching the trip lever 711 in a position where its laterally extending arm 730 is disengaged from the arm 731 of the detent pawl 732 thus permitting detent pawl 732 to rock clockwise to engage the portion 735 thereof with the teeth of the ratchet 736. As the detent pawl 732 rocks clockwise, it will permit the pawl tooth 749 to engage with the ratchet 739 and if no further signals are received by the selector magnet coils 70, the tooth 749 will start to drive the ratchet 739. The driving of the ratchet 739 by the pawl tooth 749 will continue and each time the pawl tooth 749 engages a deep tooth in the ratchet 739, the pawl tooth 748 will be permitted to engage the ratchet 736 and move it one step where it will be retained by the detent pawl 732. When the bell crank lever 725 is permitted to move from the position shown to a position where the latching projection 723 engages the latching shoulder 724, the release arm 781 will be moved down out of blocking engagement with the drive arm 795 provided the lever 768 is permitted to rock counterclockwise. However, at this time in the feed out cycle, the end of the lever 768 will be in engagement with the raised portion 767 of the camming disc 766 and the release arm 781 will therefore be held up in blocking engagement with the drive arm 795 until the camming disc 766 is driven a predetermined distance by the pawl tooth 748.

If the operation just described is permitted to continue due to the fact that no signals are received in the selector mechanism, the raised portion 767 of the camming disc 766 will ultimately be stepped beyond the lower end of the lever 768 and thereupon the release arm 781 will be dropped down out of engagement with the drive arm 795 thus to start the feeding of tape and the perforating in the tape of a combination of holes representing "letters."

After the drive arm 795 is released by the release arm 781, its cam roller 798 will follow the contour of the cam 799 and each time the shaft 30 makes one complete rotation, oscillation will be imparted to the drive arm 795 to rock the plate 800 and thereby release all of the selector slide latches 153 from the punch selector slides 156 associated with them. This sets up the "letters" combination of punches for actuation. As the drive arm 795 rocks clockwise (Fig. 3), it will also trip the function clutch 33 due to the engagement of the trip arm 802 (Fig. 4) with the bent portion 803 of the plate 804 on the trip lever 142. Each time the function clutch 33 is thus tripped, it will cause the rocker bail 282 to go through one cycle of oscillation thus to reciprocate the restoring slide bar 703. If no signals are received in the selector mechanism 24 prior to the completion of the feeding out of a measured amount of tape, the function clutch 33 will continue to be tripped and the ratchet 736 will be driven around to the position where the trip arm 765 will engage the downwardly extending arm of the bell crank lever 725 to rock the bell crank lever 725 clockwise. This will restore the tape feed out mechanism 700 to the condition shown in the drawings as described hereinbefore.

In the event a code combination of signals is fed to the selector mechanism 24 at any time during the feeding out of tape or the metering operation which occurs before tape starts to be fed out of the apparatus, the cam 786 on the selector cam sleeve 46 will engage and rock the cam lever 785 in a clockwise direction (Fig. 3). When this occurs, the shaft 783, to which the cam lever 785 is fixed, will be rocked clockwise and the bell crank lever 725 also fixed to the shaft 783 will be rocked clockwise to permit the spring 713 to rock the trip lever 711 into the position shown in the drawings. However, since the restoring slide bar 703 will be reciprocated to engage and rock the trip lever 711 counterclockwise after the cam lever 785 has been actuated, the bell crank lever 725 would be released except for the fact that when the restoring slide bar 703 moves to the left (Fig. 3) it releases the latch lever 708 which moves its transversely disposed portion 727 above the surface 728 before the trip lever 711 is actuated and consequently, the bell crank lever 725 will not be permitted to move in a counterclockwise direction. The letters combination which had been set up in the last function cycle operating under control of the tape feed out mechanism 700 will be punched in the tape and the punch selector slides 156 will be restored to the position where they may be latched by the selector slide latches 153 whereupon the selector slide latches 153 which have not been tripped by the push lever 150 responding to the incoming signal will be completely restored and latched in their right hand position (Figs. 2 and 3).

In view of the fact that the reset bail 215 will be held up by the trip latch 816 until the toggle mechanism 191 reaches its extreme position, the first signal received in the selector mechanism 24 will be accurately set up on the selector slide latches no matter what time in the feed out operation the signal is received by the selector mechanism 24.

The description thus far presupposes that it is desired to feed out a metered amount of tape and at the same time perforate the tape with the "letters" code combination.

In accordance with another embodiment of the invention, the apparatus may be utilized to effect a feed out operation of exactly the same type described hereinbefore except that instead of punching the "letters" code combination in the tape, blank tape will be fed out of the apparatus upon the cessation of the receipt of signals. The mechanism for effecting this "blank" feed out comprises a lever 822 fixed to the shaft 783 and having pivotally connected to it a bent interposer member 823. This interposer member 823, due to its pivotal connection with the lever 822, will have oscillation imparted to it when the shaft 783 is oscillated. The interposer member 823 has a slot 824 formed in it adjacent to its left end (Fig. 9) into which a pin 825 extends. This pin 825 is mounted adjacent to the end of an arm 826 of a two-armed lever 827 that is pivoted on the stationary shaft 137 which pivotally supports the reset bail cam lever 108. As described in the copending application of Arko et al., the reset bail cam lever 108 has a web portion 136 which restores the push levers 150 of the selector mechanism to their unoperated position by rocking them about the shaft 137 to disengage any of them, that have previously been actuated, from the push bar engaging shoulder 117 of their respective selector cam levers. Another arm 828 of the two-armed lever 827 extends into the path of the plate 800 mounted on shaft 797.

Figure 9:
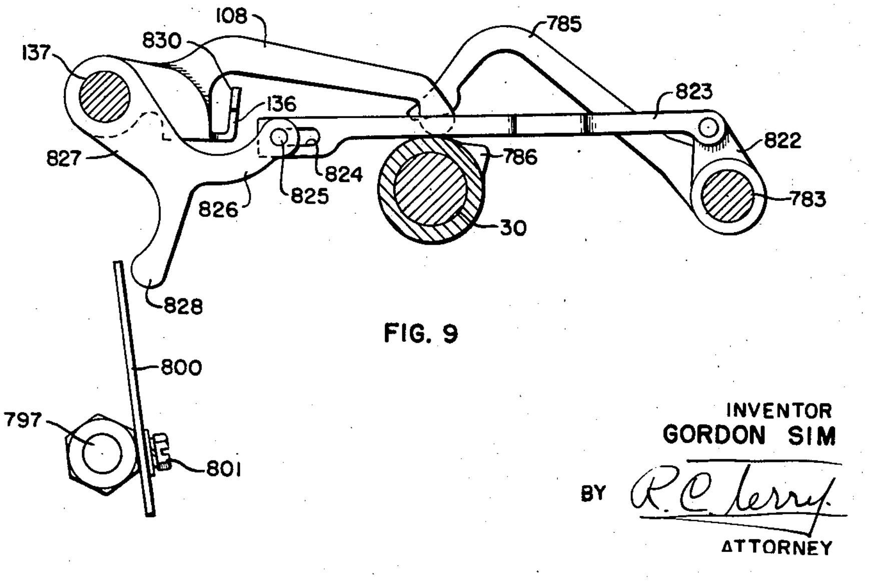
Fig. 9 is a fragmentary view taken along the line 9—9 of Fig. 8 in the direction of the arrows and Fig. 10 is a fragmentary view of mechanism which may be added to the apparatus whereby the feeding of a measured length of tape may be initiated manually.

In this embodiment of the invention, the plate 800 is reset with respect to the shaft 797 by loosening the locking nuts 801 and setting the plate 800 in its lowermost position where the main portion of it will be below the lower ends of the selector slide latches 153 so that the selector slide latches 153 will not be tripped when the shaft 797 is rocked clockwise. However, since the arm 828 of lever 827 is aligned with the upwardly extending projection 829 of the plate 800, the lever 827 will be rocked counterclockwise about the shaft 137 when the shaft 797 is rocked in a clockwise direction (Fig. 9). When the apparatus is in an inactive state after having fed out a predetermined length of tape, the lever 822 will be in the position shown in Fig. 9. However, as soon as tape feed out is initiated, due to the rocking of the shaft 783 in a counterclockwise direction (Fig. 9), the lever 822 will be rocked in a counterclockwise direction to move the left hand end (Fig. 9) of the interposer member 823 under an extending portion 830 of the web portion 136. Thus, as soon as the shaft 797 starts to rock clockwise, the lever 827, in being rocked counterclockwise by the plate 800, will lift the interposer member 823 to engage the extending portion 830 and move the reset bail cam lever 108 clockwise about the shaft 137 to restore all of the push levers 150 to their unoperated position. The apparatus operates in the manner described in connection with the "letters" feed out mechanism, except that none of the selector slide latches will be tripped and the tape will be fed out of the apparatus, perforating in it, only the tape feed holes. It is to be understood that the punch selector slides 156 will be restored to their latched position in the same manner described in connection with the "letters" tape feed out operation. When a signal is received in the selector mechanism 24, the shaft 783 will immediately be rocked clockwise (Fig. 9) to retract the interposer member 823 from operative association with the extending portion 830 of the reset bail cam lever 108 so that the first code combination received will be correctly set up by the push levers 150.

Figures 8, 10:
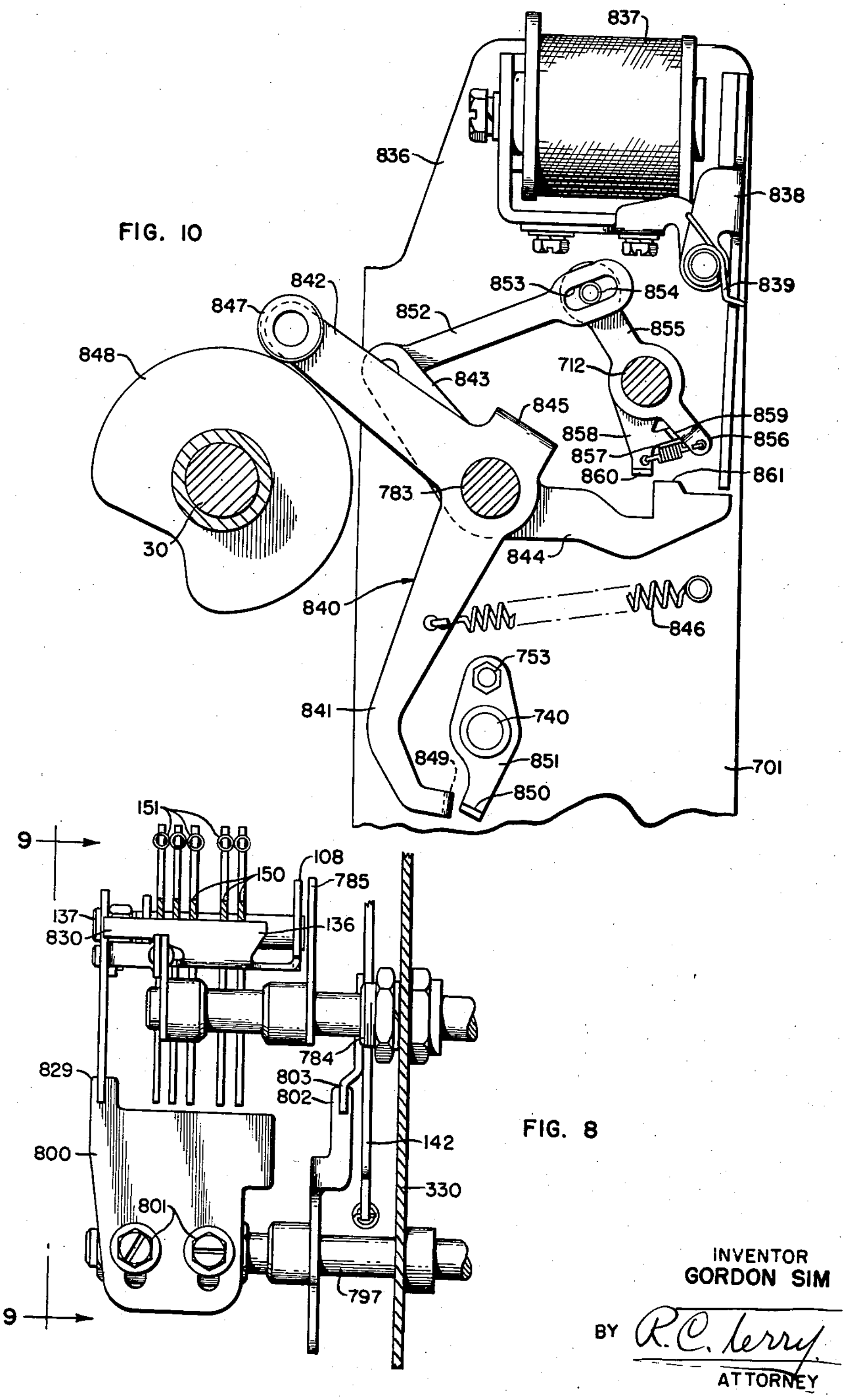
Fig. 8 is a fragmentary view of the left hand end of the apparatus shown in Fig. 4 arranged and modified to feed out "blank" tape rather than "letters" punched tape.

As may be seen by reference to Fig. 3, the mounting plate 701 has projecting upwardly from it, an extension 836 which, as shown in Fig. 10, has an electromagnet 837 mounted on it. This electromagnet has an armature lever 838 associated with it which is normally urged to rock in a clockwise direction by a coil spring 839. Upon energization of the electromagnet 837, the armature lever 838 will be rocked counterclockwise against the action of the spring 839 to move the lower end of the armature lever 838 out of the path of a multi-armed lever 840 which has arms 841 and 842 in one plane and arms 843 and 844 in another plane, the arms in one plane and the arms in the other plane being interconnected by a bail portion 845. The multi-armed lever 840 is freely oscillatable about the shaft 783 and is urged to rock counterclockwise (Fig. 10) by a contractile spring 846. The free end of the arm 842 carries a cam roller 847 that rides on a cam 848 fixed to the shaft 30. Thus once in each cycle of rotation of the shaft 30, the lever 840 will be urged to rock first in a counterclockwise direction under the influence of the spring 846 and to be returned to the position shown in Fig. 10 by the cam 848. If the electromagnet 837 is not energized, the lower end of its armature lever 838 will prevent the multi-armed lever 840 from moving an appreciable amount due to the fact that the armature lever 838 will block arm 844 of the multi-armed lever 840.

The downwardly extending arm 841 of the multi-armed lever 840 has a laterally extending projection 849 which will engage a laterally projecting portion 850 of a lever arm 851 fixed to the camming disc 766 when the multi-armed lever 840 is permitted to oscillate counterclockwise. The upwardly extending arm 843 of the multi-armed lever 840 has a link 852 pivotally attached to it that is provided with a slot 853 into which extends a pin 854 mounted on a lever 855. The lever 855 is fixed to the trip lever 711 (Fig. 3) for oscillation therewith and the lever 855 has a downwardly extending arm 856 having a spring 857 connected to it. The spring 857 is also connected to a non-repeat lever 858 whereby the lever 858 is urged to oscillate with the lever 855. The lever 858 is freely oscillatable on the shaft 712 and has two projections 859 and 860 formed on it. The projection 859 engages the downwardly extending arm 856 of lever 855 whereby the spring 857 will normally tend to hold the lever 855 and the lever 857 in the relationship shown in Fig. 10. The projection 860 will move over a shoulder 861 on the arm 844 of multi-armed lever 840 when the lever 858 is oscillated with the lever 855 and lever 711 (Fig. 3). However, when the electromagnet 837 is energized and the multi-armed lever 840 is thus permitted to rock counterclockwise under the influence of spring 846, the shoulder 861 will pass upwardly (Fig. 10) beyond the projection 860 prior to the time that the lever 855 is oscillated due to the pin and slot arrangement comprising slot 853 and pin 854. Then, when the lever 855 is rocked counterclockwise, the projection 860 will engage the side of the shoulder 861 and the spring 857 will be stretched. Consequently, when the cam 848 oscillates the multi-armed lever 840 clockwise (Fig. 10), the projection 860 will snap over the top of the shoulder 861 and will block the lever 840 from being re-operated until a measured length of the tape has been fed out of the apparatus.

In rocking counterclockwise, the multi-armed lever 840 will engage its laterally extending projection 849 with the laterally projecting portion 850 of the lever arm 851 and will drive the camming disc 766 (Fig. 3) around to a point just one tooth short of the point where the lever 768 will permit the shaft 783 to be rocked counterclockwise, thus to initiate a feed out cycle under manual control without waiting the predetermined interval that is necessary in the automatic operation of the apparatus whether the apparatus is feeding either "blank" tape or "letters" tape. Therefore, a signal received in the selector mechanism 24 at this time will not be mutilated but the first code combination received will be correctly set up. Any suitable key (not shown) may be used to connect a source of current (also not shown) to the electromagnet 837 to energize it.

The manual tape feed out operation may be initiated at any time when signals are not being received in the selector mechanism 24 and if a signal is received by the selector mechanism 24 during a feed out operation under manual control, the shaft 783 will be rocked clockwise by the cam lever 785 and will interrupt the tape feed out operation without interfering with the incoming signal in the same manner as was described in connection with the "letters" feed out operation.

The amount of tape fed out on each tape feed out cycle may be predetermined by adjusting the position of the trip plate 764 with respect to the camming disc 766 thereby determining the amount of tape that will be fed out by the tape feed out mechanism 700 before the trip arm 765 engages the downwardly projecting arm of the bell crank lever 725.

Although the invention has been described in connection with a certain specific form thereof, it will be understood that it has further applications, and that it is not limited to the embodiment shown.

What is claimed is:

1. A printing telegraph tape perforating apparatus including a selector mechanism responsive to permutation code line signals, a perforator having punches therein selectively operable under control of said selector mechanism, means in said selector mechanism for initiating an operation of the perforator after the selector mechanism has selected punches therein for operation, a tape feed out mechanism conditioned for operation once in each cycle of operation of said perforator, and means in said selector mechanism for disabling said tape feed out mechanism immediately upon the initiation of a cycle of operation of the selector mechanism and for causing said perforator to operate in response to and in accordance with line signals received in the cycle of operation of the selector mechanism that disables the tape feed-out mechanism.

2. A printing telegraph tape perforating apparatus comprising a selector mechanism responsive to permutation code line signals, a perforator having punches therein selectively operable under control of said selector mechanism, means in said selector mechanism for initiating an operation of the perforator after the selector means has selected punches in the perforator for operation, a tape feed out mechanism conditioned for operation once in each cycle of operation of said perforator for controlling the perforator when line signals cease to be directed to the selector mechanism, and means in said selector mechanism for disabling said tape feed out mechanism immediately upon the initiation of a cycle of operation of the selector mechanism and in the same cycle of the selector mechanism in which a line signal is received, whereby no line signal is lost or mutilated.

3. A printing telegraph tape perforating apparatus comprising a main power shaft, a selector mechanism responsive to permutation code line signals, a perforator having punches therein selectively operable under control of said selector mechanism, means in said selector mechanism for initiating an operation of the perforator after the selector mechanism has selected punches therein for operation, a tape feed out mechanism for effecting operation of said perforator and including a pawl mechanism constantly driven by said main power shaft, a ratchet mechanism for operation by said pawl mechanism, a lever arrangement conditioned for operation once in each cycle of operation of said perforator for causing said pawl mechanism to drive said ratchet mechanism, and means in said selector mechanism for disabling said lever arrangement immediately upon the initiation of a cycle of operation of the selector.

4. A printing telegraph tape perforating apparatus including a cyclically operable selector mechanism responsive to permutation code line signals, a cyclically operable perforator having punches selectively operable under control of said selector mechanism, means in said selector mechanism for initiating an operation of the perforator after the selector mechanism has selected punches for operation, a tape feed out mechanism conditioned for operation once in each cycle of operation of said perforator, means in said selector mechanism for disabling said tape feed out mechanism immediately upon the initiation of a cycle of operation of the selector mechanism and for causing said perforator to operate in response to and in accordance with line signals received in the cycle of operation of the selector mechanism that disables the tape feed-out mechanism, and means responsive to the cessation of cyclic operation of the selector mechanism in response to line signals for rendering the tape feed out mechanism inoperable to feed tape for a predetermined interval of time.

5. A printing telegraph tape perforator apparatus including a selector mechanism responsive to permutation code line signals, a perforator having punches selectively operable under control of said selector mechanism, a drive shaft common to said selector mechanism, and said perforator, means individual to the perforator and the selector mechanism for connecting them to said drive shaft for one cycle of rotation thereof, means in said selector mechanism for initiating an operation of the perforator after the selector means has selected punches in the perforator for operation, a tape feed out mechanism conditioned for operation once in each cycle of operation of said perforator and operable to actuate said perforator, means in said selector mechanism for disabling said tape feed out mechanism immediately upon the initiation of a cycle of operation of the selector mechanism, and means responsive to the cessation of each cycle of operation of the selector mechanism in response to line signals for rendering the tape feed out mechanism inoperable to feed tape for a predetermined interval of time.

6. A printing telegraph tape perforating apparatus including a selector mechanism responsive to permutation code line signals, a perforator selectively operable under control of said selector mechanism for perforating a tape and advancing the tape step by step, means in said selector mechanism for initiating an operation of the perforator after the selector means has selectively controlled the perforator, a tape feed out mechanism conditioned for operation once in each cycle of operation of said perforator and operable to actuate the perforator, means in said selector mechanism for disabling said tape feed out mechanism immediately upon the initiation of a cycle of operation of the selector mechanism and for causing said perforator to operate in response to and in accordance with line signals received in the cycle of operation of the selector mechanism that disables the tape feed-out mechanism, and means responsive to the cessation of cyclic operation of the selector mechanism in response to line signals for rendering the tape feed out mechanism operable to feed tape after the expiration of a predetermined interval of time.

7. In a telegraph receiver having a selector mechanism responsive to code signals received over a line, and a cyclically operable recording means normally controlled by said selector mechanism for producing a record on a tape and advancing said tape upon each operation of the selector mechanism, means for causing said recording means to feed tape upon cessation of operation of the selector mechanism comprising metering means, cyclically operable driving means for said metering means, means actuated by said selector mechanism for disabling said driving means, means operable under control of said metering means for activating the recording means, and means for delaying the operation of said last-mentioned means for a predetermined interval of time.

8. In a telegraph receiver having a selector mechanism responsive to code signals received over a line, and a cyclically operable recording means normally controlled by said selector mechanism for producing a record on a tape and advancing said tape upon each operation of the selector mechanism, means for causing said recording means to feed tape upon cessation of operation of the selector mechanism comprising metering means, cyclically operable driving means for said metering means, means operable under control of said metering means for activating the recording means, means for delaying the operation of said last-mentioned means for a predetermined interval of time, and means in said selector mechanism operable immediately upon initiation of operation of said selector means for disabling the means that causes the activating of the recording means of the tape upon cessation of the receipt of signals.

9. In a telegraph receiver having a selector mechanism responsive to code signals received over a line, and a cyclically operable perforating means normally controlled by said selector mechanism for perforating a record of received code signals on a tape and advancing said tape upon each operation of the selector mechanism, means for causing said perforating means to feed tape and perforate a "letters" code combination in the tape upon cessation of operation of the selector mechanism comprising metering means, cyclically operable driving means for said metering means, means actuated by said selector mechanism for disabling said driving means, means operable under control of said metering means for activating the perforating means independently of the selector mechanism, and means for delaying the operation of said last-mentioned means for a predetermined interval of time.

10. In a telegraph receiver having a selector mechanism responsive to code signals received over a line, and a cyclically operable perforating means normally controlled by said selector mechanism for producing a perforated record of received code signals on a tape and advancing said tape upon each operation of the selector mechanism, means for causing said perforating means to feed "blank" tape upon cessation of operation of the selector mechanism comprising metering means, cyclically operable driving means for said metering means, means actuated by said selector mechanism for disabling said driving means immediately upon receipt of a signal in said selector mechanism, means operable under control of said metering means for activating the perforating means, and means for delaying the operation of said last-mentioned means for a predetermined interval of time.

11. In a telegraph receiver having a selector mechanism responsive to code signals received over a line, and a cyclically operable recording means normally controlled by said selector mechanism for producing a record on a tape and advancing said tape upon each operation of the selector mechanism, means for causing said recording means to feed tape upon cessation of operation of the selector mechanism comprising metering means, cyclically operable driving means for said metering means, means operable under control of said metering means for activating the recording means, means for delaying the operation of said last-mentioned means for a predetermined interval of time, means in said selector mechanism operable immediately upon initiation of operation of said selector means for disabling the means that causes the activating of the recording means of the tape upon cessation of the receipt of signals, and manually controlled means for initiating the feeding of a metered amount of tape including means for disabling said means for delaying the means for activating the recording means.

12. A printing telegraph tape perforator comprising a plurality of punches, selectively operable punch selector slides for actuating said punches, a selector mechanism responsive to permutation code signals for registering a code selection, latches operable under control of said selector mechanism for releasing said selector slides to select punches for actuation, power means for causing the released selector slides to actuate their punches, a main drive shaft, a function clutch operable under control of the selector mechanism for connecting the power means to the main drive shaft, pawl means continuously driven by said main drive shaft, metering means for actuation by said pawl means, a trip lever normally holding said pawl means out of operative relation with said metering means, a slide bar for moving said trip lever out of holding relation with said pawl means, means for latching said trip lever out of holding relation with said pawl means, means operated by said slide bar in each cycle of operation of the slide bar for temporarily blocking movement of said means for latching the trip lever out of latching position, a cam lever connected to said latching means and actuated by the selector mechanism upon initiation of a cycle of operation of the selector mechanism for rocking said latching means out of latching relation with said trip lever, function clutch tripping means conditioned for operation on each cycle of rotation of said main drive shaft, blocking means movable with said latching means for blocking operation of the clutch tripping means, means controlled by said metering means for preventing the blocking means from following the bell crank lever until the pawl means have actuated the metering means a predetermined number of times, and means on the function clutch tripping means for tripping the latches which release the punch selector slides whereby a "letters" code combination will be printed each time the function clutch tripping means is operated.

13. A printing telegraph tape perforator comprising a plurality of punches, selectively operable punch selector slides for actuating said punches, a selector mechanism responsive to permutation code signals for registering a code selection, latches operable under control of said selector mechanism for releasing said selector slides to select punches for actuation, power means for causing the released selector slides to actuate their punches and for feeding the tape one step for each cycle of operation of the selector mechanism, a main drive shaft, a function clutch operable under control of the selector mechanism for connecting the power means to the main drive shaft, pawl means continuously driven by said main drive shaft, metering means for actuation by said pawl means, a trip lever normally holding said pawl means out of operative relation with said metering means, a slide bar operated by said power means once in each cycle of its operation for moving said trip lever out of holding relation with said pawl means, an oscillatory shaft, a bell crank lever fixed to said shaft for latching said trip lever out of holding relation with said pawl means, a latch lever oscillated by said slide bar in each cycle of operation of the slide bar for temporarily blocking movement of said bell crank to a latching position, a cam lever fixed to said oscillatory shaft and actuated by the selector mechanism upon initiation of a cycle of operation of the selector mechanism for rocking said bell crank lever out of latching relation with said trip lever, function clutch tripping means conditioned for operation on each cycle of rotation of said main drive shaft, blocking means movable with said bell crank for blocking operation of the clutch tripping means, a lever held in a predetermined position by said metering means until said metering means has been actuated a predetermined number of times to prevent the blocking means from following the bell crank lever until the pawl means have actuated the metering means a predetermined number of times, and means on the function clutch tripping means for tripping the latches which release the punch selector slides to cause a "letters" code combination to be perforated in the tape each time said function clutch tripping means is operated.

14. A printing telegraph tape perforator comprising a plurality of punches, selectively operable punch selector slides for actuating said punches, a selector mechanism responsive to permutation code signals, latches operable under control of said selector mechanism for releasing said selector slides to select punches for actuation, power means for causing the released selector slides to actuate their punches, a main drive shaft, a function clutch operable under control of the selector mechanism for connecting the power means to the main drive shaft, pawl means continuously driven by said main drive shaft, metering means for actuation by said pawl means, a trip lever normally holding said pawl means out of operative relation with said metering means, a slide bar operated by said power means once in each cycle of its operation for moving said trip lever out of holding relation with said pawl means, an oscillatory shaft, a bell crank lever fixed to said shaft for latching said trip lever out of holding relation with said pawl means, a latch lever oscillated by said slide bar in each cycle of operation of the slide bar for temporarily blocking movement of said bell crank to a latching position, a cam lever fixed to said oscillatory shaft and actuated by the selector mechanism upon initiation of a cycle of operation of the selector mechanism for rocking said bell crank lever out of latching relation with said trip lever, function clutch tripping means conditioned for operation on each cycle of rotation of said main drive shaft, blocking means movable with said bell crank lever for blocking operation of the clutch tripping means, a lever held in a predetermined position by said metering means until said metering means has been actuated a predetermined number of times to prevent the blocking means from following the bell crank lever until the pawl means have actuated the metering means a predetermined number of times, and manually controlled means for actuating said trip lever and for disabling the lever which prevents the blocking means from following the bell crank lever.

15. A printing telegraph tape perforator comprising a plurality of punches, selectively operable punch selector slides for actuating said punches, a selector mechanism responsive to permutation code signals for registering a code selection, latches operable under control of said selector mechanism for releasing said selector slides to select punches for actuation, power means for causing the released selector slides to actuate their punches, a main drive shaft, a function clutch operable under control of the selector mechanism for connecting the power means to the main drive shaft, pawl means continuously driven by said main drive shaft, metering means for actuation by said pawl means, a trip lever normally holding said pawl means out of operative relation with said metering means, a slide bar for moving said trip lever out of holding relation with said pawl means, means for latching said trip lever out of holding relation with said pawl means, means operated by said slide bar in each cycle of operation of the slide bar for temporarily blocking movement of said means for latching the trip lever out of latching position, a cam lever connected to said latching means and actuated by the selector mechanism upon initiation of a cycle of operation of the selector mechanism for rocking said latching means out of latching relation with said trip lever, function clutch tripping means conditioned for operation on each cycle of rotation of said main drive shaft, blocking means movable with said latching means for blocking operation of the clutch tripping means, means controlled by said metering means for preventing the blocking means from following the bell crank lever until the pawl means have actuated the metering means a predetermined number of times, and means connected to said latching means for erasing a code selection from the selector mechanism whereby a "blank" code combination will be printed each time the function clutch tripping means is operated.

16. A printing telegraph tape perforator comprising a plurality of punches, selectively operable punch selector slides for actuating said punches, a selector mechanism responsive to permutation code signals for registering a code selection, latches operable under control of said selector mechanism for releasing said selector slides to select punches for actuation, power means for causing the released selector slides to actuate their punches and for feeding the tape one step for each cycle of operation of the selector mechanism, a main drive shaft, a function clutch operable under control of the selector mechanism for connecting the power means to the main drive shaft, pawl means continuously driven by said main drive shaft, metering means for actuation by said pawl means, a trip lever normally holding said pawl means out of operative relation with said metering means, a slide bar operated by said power means once in each cycle of its operation for moving said trip lever out of holding relation with said pawl means, an oscillatory shaft, a bell crank lever fixed to said shaft for latching said trip lever out of holding relation with said pawl means, a latch lever oscillated by said slide bar in each cycle of operation of the slide bar for temporarily blocking movement of said bell crank to a latching position, a cam lever fixed to said oscillatory shaft and actuated by the selector mechanism upon initiation of a cycle of operation of the selector mechanism for rocking said bell crank lever out of latching relation with said trip lever, function clutch tripping means conditioned for operation on each cycle of rotation of said main drive shaft, blocking means movable with said bell crank for blocking operation of the clutch tripping means, a lever held in a predetermined position by said metering means until said metering means has been actuated a predetermined number of times to prevent the blocking means from following the bell crank lever until the pawl means have actuated the metering means a predetermined number of times, a slide bar reciprocated by said oscillatory shaft and connected to the function clutch tripping means for oscillation thereby for erasing a code selection from the selector mechanism whereby a "blank" code combination will be printed each time the function clutch tripping means is operated.

References Cited in the file of this patent

UNITED STATES PATENTS

| | | |
|---|---|---|
| 2,361,004 | Bacon | Oct. 24, 1944 |
| 2,381,871 | Bacon et al. | Aug. 24, 1945 |